United States Patent
Besset-Bathias (10) Patent No.: US 6,711,126 B1
(45) Date of Patent: Mar. 23, 2004

(54) CONGESTION CONTROL OF AAL2 CONNECTIONS

(75) Inventor: Claire Besset-Bathias, Neuilly sur Seine (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/476,134

(22) Filed: Jan. 3, 2000

(30) Foreign Application Priority Data

Nov. 12, 1999 (EP) .............................. 99402809

(51) Int. Cl.[7] ..................... G01R 31/08; G06F 11/00; G08C 15/00; H04J 1/16; H04L 1/00
(52) U.S. Cl. ...................... 370/229; 370/428; 370/429; 370/235; 370/468; 370/395.21; 370/395.61; 370/395.63; 370/395.64; 370/395.65; 709/235
(58) Field of Search ...................... 370/395.21, 395.64, 370/468, 235, 229, 389, 395.61, 395.63, 395.65, 429, 428; 709/230, 235, 236

(56) References Cited

U.S. PATENT DOCUMENTS

| | | | | |
|---|---|---|---|---|
| 5,555,264 A | * | 9/1996 | Sallberg et al. | 370/414 |
| 5,822,540 A | * | 10/1998 | Caldara et al. | 709/230 |
| 5,838,677 A | * | 11/1998 | Kozaki et al. | 370/235 |
| 6,049,527 A | * | 4/2000 | Isoyama et al. | 370/235 |
| 6,169,738 B1 | * | 1/2001 | Sriram et al. | 370/395.64 |
| 6,219,339 B1 | * | 4/2001 | Doshi et al. | 370/235 |

FOREIGN PATENT DOCUMENTS

EP    0 915 634 A2   5/1999

OTHER PUBLICATIONS

HongQing Li et al.: "Performance of TCP Over UBR Service in ATM Networks with Per–VC Early Packet Discard Schemes" Proceedings of the IEEE Annual International Phoenix Conference on Computers and Communications, US, New York, IEEE, vol. Conf. 15, 1996, pp. 350–357, XP000594803, ISBN: 0–7803–3256–3.

* cited by examiner

*Primary Examiner*—Wellington Chin
*Assistant Examiner*—Chuong Ho
(74) *Attorney, Agent, or Firm*—Sughrue Mion, PLLC

(57) ABSTRACT

The invention concerns a method of managing data packets originating from data frames, the packets being presented to buffer (40) prior to processing. When a packet corresponding to the start of a frame is presented to the buffer stage, it is determined whether the filling level of the buffer (40) exceeds a first predetermined filling threshold (42) corresponding to a state of congestion and, if such is the case, this packet and all packets belonging to that same frame are systematically discarded before the buffer.

The frames can e.g. originate from AAL2 connections, and each constitute a respective ATMS adaptation layer service data unit (AAL2 SDU), in which case the packets are common part sublayer (CPS) packets, and the buffer (40) stores the CPS packets before the latter are multiplexed into asynchronous transfer mode (ATM) cells.

The invention also relates to an apparatus for implementing the above method.

16 Claims, 6 Drawing Sheets

CONGESTION CONTROL OF AAL2 CONNECTIONS

BACKGROUND OF THE INVENTION

The present invention relates to the field of data transfer in the form of asynchronous packets in radio or cable communication networks. When packets are transferred asynchronously, there is a risk of congestion at the network nodes if the instantaneous flowrate of incoming packets exceeds the maximum throughput capacity of the multiplex. In this context, the invention concerns more specifically—but not exclusively—a protocol for managing such congestions in buffers which multiplex network connections known as AAL2 (ATM (asynchronous transfer mode) adaptation layer 2) connections.

AAL2 is used amongst others in UTRAN (UMTS (universal mobile telecommunication system) terrestrial radio access network). UTRAN is the terrestrial radio access network for UMTS. UMTS constitutes the third generation mobile system (3GPP) defined by the standardisation organisation.

The AAL2 protocol and its implementation in data transmission systems are well established and are now standardised for example in the publication by the International Telecommunication Union Telecommunication Standardization Sector (ITU-T), Recommendation I366.1 (June 1998) entitled "Series I: Segmentation and Reassembly Service Specific Convergence Sublayer for the AAL type 2" and, also from ITU-T, recommendation I.363.2 entitled "B-ISDN ATM Adaptation layer type 2 Specification" whose contents are considered as included in the state of the art.

Figure 1:
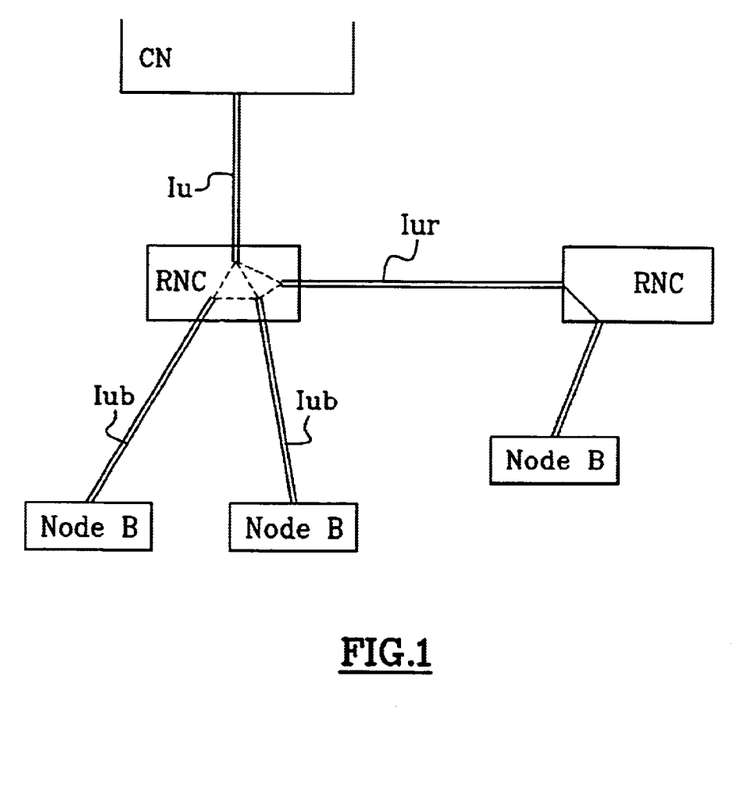
FIG. 1, already described, shows an example of part of a network complying to UMTS standards defined in the 3GPP of a terrestrial access network.

FIG. 1 is a schematic diagram showing an example of part of a communication network linking a core network (CN) to two controllers (RNCs) which are themselves connected to base stations referred to as Node B. By analogy, a Node B is equivalent to a base transceiver station (BTS) in the GSM system. The Node B and RNC are connected together by an interface known as Iub (interface UMTS bis, equivalent to the Abis interface of the GSM). The RNC is connected to the core network CN via an interface Iu (UMTS interface).

The RNCs are connected together by an interface Iur (UMTS interface between two RNCs). These interfaces are based on ATM. ATM is used as a transport layer for the Iu, Iur and Iub interfaces.

Interfaces Iur and Iub receive radio frames or multiple radio frames. At radio level, frames have a 10 ms duration. The time interval between frame transmissions on the Iub and Ur interfaces is typically 10 ms, 20 ms, 40 ms or 80 ms (respectively equivalent to 1, 2, 4 or 8 radio frames).

UMTS serves to transport data and voice, and possibly several other types of service, some of which can have a baud rate of up to 2 Mbits/s.

The transport of data shall be illustrated with an example of a message containing voice at a baud rate of 8 kbits/s. Accordingly, to send frames every 10 ms, 80 bits or 10 octets will be used. Sending voice frames every 20 ms requires 160 bits, or 20 octets (bytes) With a data service at 144 Kbits/s, frames can be formed in groups of four or eight. Transmission time intervals are generally 40 or 80 ms. For 80 ms frames, 1440 octets per frame will be available on the Iub interface. With 40 ms frames, 720 octets will be available per frame on the Iub interface.

The ATM system uses cells of 53 octets (bytes): 5 octets for connection identification information and 48 octets forming the payload.

Information (for example the above-mentioned 10 or 1440 octets) must therefore be transported by ATM cells each having 48 octets available.

To this end, an ATM adaptation layer is used, namely the AAL2. This adaptation layer comprises a number of sublayers: a service specific segmentation and reassembly sublayer (SSSAR) forming part of SEG-SSCS (optional) which allows data packets exceeding 45 octets to be segmented. Another sublayer, known as the common part sublayer (CPS), allows the SSSAR service data units (SDUs) to be multiplexed into the payload of an ATM cell (the payload of the ATM cell is always 48 octets).

Figure 2:
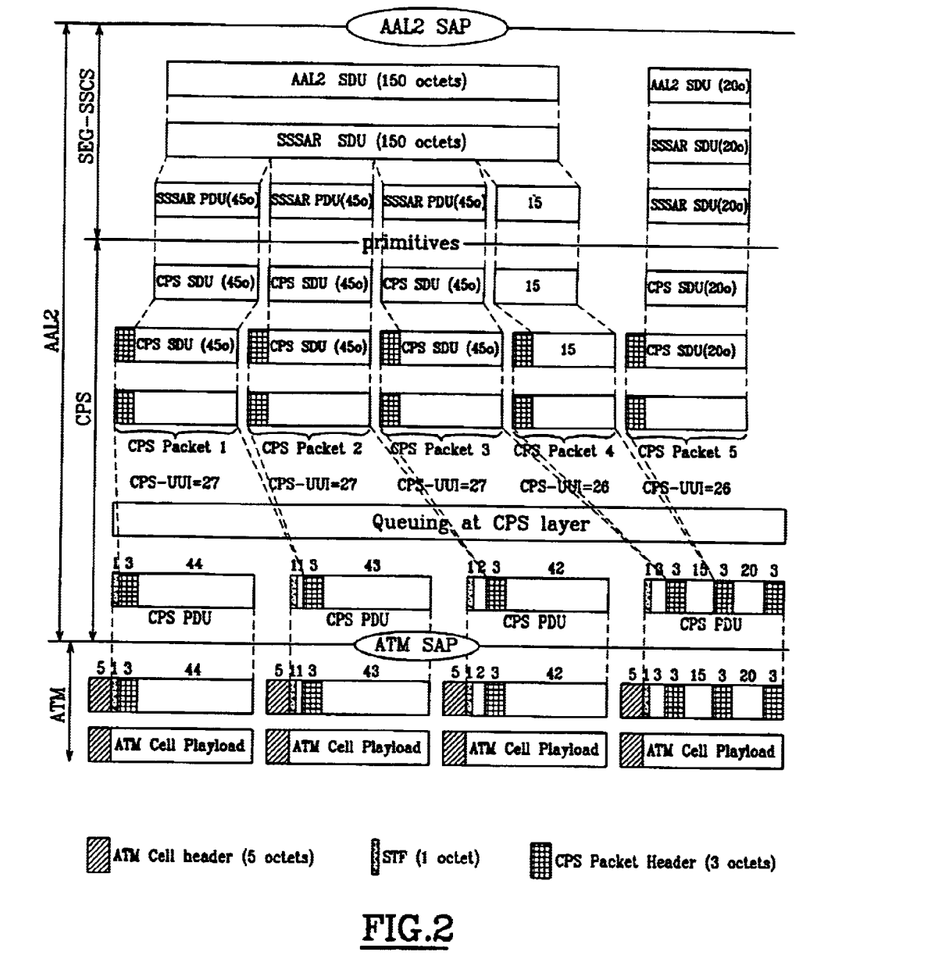
FIG. 2, already described, shows an example of the breakdown and multiplexing of AAL2 SDU frames into ATM cells through different AAL2 and ATM layers.

FIG. 2 is a diagram showing the different AAL2 sublayers and the ATM layer which come into play when a frame is sent on the Iub or Iur interface. Right at the bottom of the figure are shown the ATM cells comprising the 48 octet payload plus a 5 octet header.

The figure is based on an example of a 150 octet long AAL2 SDU frame which is shown as the topmost layer in the figure. The service specific convergence sublayer (SSCS) used is the SEG-SSCS (segmentation and reassembly service specific convergence sublayer). In the example, it is reduced to the service specific segmentation and reassembly (SSSAR) sublayer. SSSAR SDU frames thus have the same length as AAL2 SDU frames. This length can change over time and depends on the baud rate, the amount of data to be transported, etc. . . .

Two AAL2 layers shall be of interest in the present case: the mandatory common part sublayer (CPS) and the segmentation and reassembly service specific convergence sublayer (SEG-SSCS), which is an optional segmentation and reassembly layer.

As its name indicates, the SSSAR will segment (and reassemble) the SSSAR SDUs (in the present case 1 AAL2 SDU=1 SSSAR SDU) into packets referred to as SSSAR protocol data units PDUs whose maximum size by default is 45 octets. Consequently, the 150-octet AAL2 SDU of the example can be divided up into three 45-octet SSSAR PDUs and the 15 remaining octets can be loaded into a fourth SSSAR PDU.

The SSSAR PDUs are then transferred to the mandatory common part sublayer (CPS), keeping the condition that one SSSAR PDU corresponds to one CPS SDU as regards the format and in particular the number of constitutive octets.

The CPS layer multiplexes the CPS SDUs it receives on 48 octets that form the ATM cell payload.

Figure 3:
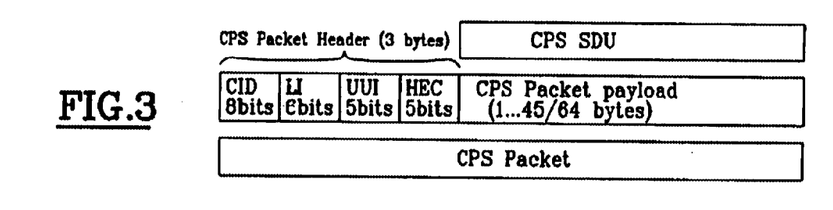
FIG. 3, already described, shows the detailed structure of a CPS SDU header.

To this end, the CPS layer will add a 3 octet header to each CPS SDU it receives for identification of each CPS SDU. These three octets, which are shown in FIG. 3, comprise:

a 5 bit error correction field HEC;

an 8 bit CID field which identifies the AAL2 connection number, i.e. the channel user AAAL2 CPS;

a 6 bit LI field which indicates the payload length minus one of the CPS packet. The maximum length of the CPS packet is 45 octets by default, but this value can be increased to 64 octets by signalling;

a 5 bit UUI (user-to-user interface) field. For SEG SSCS, a CPS-UUI is used to implement a "More Data" bit. A UUI value equal to "27" indicates that more data are required to complete the reassembly of an SSSAR-SDU. A value equal "26" indicates the reception of the last data of an SSSAR SDU. Any other value, i.e. between 0 and 26 should not be used for reasons of compatibility with other SSCS specifications.

Thus, in the case of a segmentation, the UUI field has the value "26" to indicate receipt of an end of SSSAR SDU (150 octets in the example), and the value "27" to indicate that more data follows.

In other words, all the while UUI field yields "27", the received packets are incomplete and as soon as it yields "26", the packets can be reassembled and will belong to a given SSSAR SDU.

In a classical installation, if the SSSAR detects errors during reassembly of an SSSAR SDU, the complete CPS SDU must be discarded.

These three octets are found again in the CPS packet header.

In the case of only one CPS PDU, there is also a CPS-PDU start field (STF) octet which serves to identify the position of the first CPS packet inside the payload of the ATM cell or CPS PDU.

A CPS PDU corresponds to the payload of an ATM cell.

The size of CPS PDU is always equal to 48 octets (equal to an ATM cell payload). The first CPS PDU octet is always the STF octet. The 47 remaining octets are either CPS packet octets or padding.

Note that in the case where the CPS SDU is 45 octets, the CPS packet has a size of 45+3=48 octets.

Accordingly, the first 47 octets can be inserted into one CPS PDU. The last remaining octet shall go into another CPS PDU.

Thus upon multiplexing CPS SDUs into CPS PDUs, a straddling is created at the level of the payload. As shown in FIG. 2, the 45 payload octets of CPS SDU number 1 are divided on two CPS PDUs, with 44 octets in the first CPS PDU (thus filling up entirely the payload of that packet) and the remaining octet in the following CPS PDU. This octet is located directly after the STF octet of the following CPS PDU.

It will be understood that the second CPS PDU can dispose of only 43 octets for multiplexing the second CPS SDU. Consequently, the last two octets of that second CPS SDU shall be integrated in the third CPS PDU, just after the STF of the latter.

Thus the STF octet for the CPS PDU will indicate that the start of the first CPS packet is located immediately after the STF octet. For the second CPS PDU, the STF octet will indicate that the start of the second packet is located as from the second octet, and for the third CPS PDU, the STF octet will indicate that the start of the third CPS packet will be located as from the third octet.

As shown in FIG. 2, the fourth CPS PDU comprises the STF octet followed by the three remaining octets of the third CPS SDU, followed by its own 3 octet header and all the 15 octets of the fourth CPS SDU, i.e. a total of 22 octets. This fourth CPS PDU thus disposes of 26 free octets in its payload.

In the example, these 26 octets are partially exploited for multiplexing the following AAL2 SDU which, as shown in the top line of FIG. 2, comprises only 20 octets. This AAL2 SDU can e.g. correspond to another connection for sampling voice at 20 ms.

As for the first 150 octet AAL SDU, this 20 octet AAL SDU is converted in the form of a CPS SDU (only one single packet in this case) comprising the above-mentioned 3 octet header plus 20 payload octets, forming a total of 23 octets. This CPS packet can be integrally contained in the fourth CPS PDU which disposes of 26 free octets. The 3 unused octets of this fourth CPS PDU are filled with padding octets devoid of any information.

The thus-multiplexed CPS PDUs are then transferred to the ATM layer via the ATM service access point (SAP), The ATM layer comprises ATM cells which are each composed of a 5 octet header and a 48 octet payload. A CPS PDU can thus be integrally contained in the payload of an ATM cell.

In practice, CPS packets are stored in buffers before being transposed into corresponding ATM cells via the intermediate multiplexing into CPS PDUs. Indeed, the information arrives at the buffers asynchronously and some non-negligible processing time is required to transform the CPS packets into CPS PDUs. It is thus possible to receive at a given moment more information in the form of CPS packets than can be transferred on the interface. This is the reason why the packets must be buffered.

Figure 4:
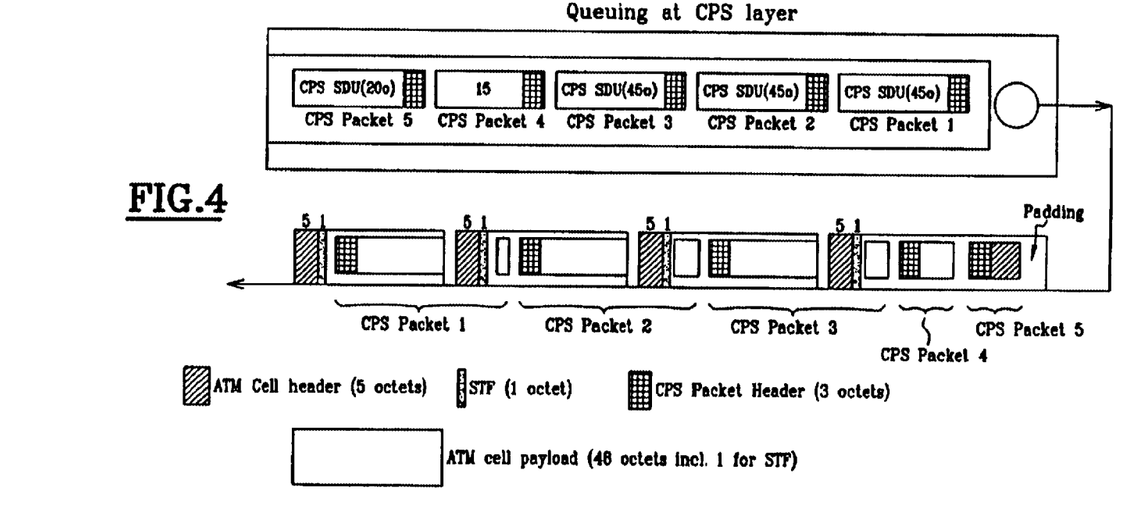
FIG. 4, already described, shows the queuing of CPS packets at the buffer entrance for the case of example 2, waiting to be multiplexed to form CPS PDUs.

The arrival of CPS packets into a buffer for the case of FIG. 2 is shown schematically in FIG. 4. The top portion of the figure shows the 5 CPS packets stored provisionally according to a FIFO principle. These packets are sent synchronously to a unit (not shown) whose function is to transform them into CPS PDUs as explained above to create the payloads for the corresponding ATM cells.

Now, in UMTS, the incoming load at the level of the buffers to form ATM cells can be very temporarily greater than 1. In other words, there occurs the situation in which more CPS packets arrive than can be multiplexed and outputted in ATM cells. A momentary overload can then occur. If this overload situation lasts for too long, the buffers can overflow, and CPS packets can hence be lost.

In the state of the art, when the buffers are full, the incoming packets have to be discarded in a random manner, without taking their origin into account. Generally speaking, there is no appropriate management of the buffers and the packets that cause the buffer to overflow are systematically discarded all the while the latter is full. As a result, a number of AAL2 SDU blocks can be unnecessarily destroyed.

SUMMARY OF THE INVENTION

In view of these problems, the present invention proposes a method of managing data packets originating from data frames, the packets being presented to buffer means prior to processing, wherein, when a packet corresponding to the start of a frame is presented to the buffer stage, it is determined whether the filling level of the buffer means exceeds a first predetermined filling threshold corresponding to a state of congestion and, if such is the case, this packet and all packets belonging to that same frame are systematically discarded before the buffer.

The method according to the invention lends itself particularly well to the above-mentioned AAL2 connections, in which case the frames in question originate from AAL2 connections, and each constitute a respective ATM (asynchronous transfer mode) adaptation layer service data unit (AAL2 SDU), and the packets are common part sub-layer (CPS) packets, and the buffer means stores the CPS packets before the latter are multiplexed into asynchronous transfer mode (ATM) cells. In order not to destroy a frame (corresponding e.g. to an AAL2 SDU) in the course of being stored in a buffer, if the first threshold is exceeded, packets are still allowed to enter into the buffer means but only if the packets on the one hand follow a first packet admitted into the buffer means prior to the first threshold being exceeded and on the other hand originate from the same frame as that first packet.

Various different criteria can be contemplated for determining the buffer's threshold level of congestion. In a preferred embodiment, the state of congestion is attained upon exceeding the first threshold and the state of congestion is left by passing below a second filling threshold of the buffer means, the second threshold being lower than the first threshold. Consequently, the congestion criterion exhibits a hysteresis effect.

According to a first embodiment of the invention, the first threshold is set such that the remaining capacity of the memory upon exceeding that threshold is substantially sufficient to accept all remaining packets of a frame whose first packet has been accepted into the buffer means. In this way, no frame in the course of being loaded into the buffer can be lost.

In the case of AAL2 connections, a mechanism can be set up in which:
  for each CPS packet, the user-to-user interface (UUI) field is used to determine if the packet is the last CPS packet forming an ATM (asynchronous transfer mode) adaptation layer type 2 (AAL2) service data unit (SDU) and, if such is the case, to determine the following common part sublayer (CPS) packet as a first packet;
  in the case of a first CPS packet of an AAL2 service data unit (SDU) frame, it is detected if the buffer means are in a state of congestion;
  in the case of a congestion, the first CPS packet and all the following CPS packets are discarded up to and including the CPS packet for which it is detected that the UUI field of that CPS packet corresponds to the last CPS packet of the current AAL2 SDU frame.

Moreover, it is possible to proceed such that:
  for each CPS packet, the user-to-user interface (UUI) field is used to determine if the packet is the last CPS packet forming an AAL2 SDU and, if such is the case, to determine the following CPS packet as a first packet;
  in the case of a first CPS packet of an AAL2 SDU frame, it is detected if the buffer means are in a state of congestion;
  if the buffer means are not in a state of congestion the first CPS packet and all the CPS packets that follow are accepted into said buffer means up to and including the one for which it is detected that the UUI field of that CPS packet corresponds to the last packet of the current AAL2 SDU frame.

The mechanism can also operate so that:
  for each CPS packet, the user-to-user interface (UUI) field is used to determine if the packet is the last CPS packet forming an AAL2 SDU and, if such is the case, to determine the following CPS packet as a first packet;
  in the case of a first CPS packet of an AAL2 SDU frame, it is detected if the buffer means are in a state of congestion;
  if the buffer means are not in a state of congestion said first CPS packet is accepted into the buffer means and, for each following CPS packet belonging the same AAL2 SDU frame as the first packet, the packet is accepted only if said buffer means are not in a state of saturation.

In the case of an AAL2 data transmission system, the data frame would be an entire AAL2 SDU and hence the CPS packets belonging to that AAL2 SDU would be systematically discarded in case of congestion.

In other words, when a congestion situation occurs in the case of AAL2 connections, the packet discard mechanism in brought into action to eliminate intelligently all CPS packets of an entire AAL2 SDU, instead of only certain packets from each AAL2-SDU.

Indeed, if one or several CPS packets of an AAL2 SDU are lost, the entire AAL2 SDU is lost. In this case according to the invention all the AAL2 SDUs which would in any be lost are discarded. In so doing, space is cleared in the memory by allowing the latter to discharge during the packet discarding process.

Still in the case of an AAL2 communication system, the selective elimination can be advantageously achieved by exploiting the UUI field of the above mentioned CPS packet header, this field indicating the receipt of the last data of an SSSAR SDU frame, whose length is equivalent to that of a corresponding AAL2 SDU.

In this case, a mechanism in accordance with the invention can be implemented to determine the value of the UUI field: if the congestion threshold is reached, the mechanism allows entry of all the remaining packets of an AAL2 SDU already started to be admitted prior to the congestion threshold being reached if the following packets have a UUI field equal to 27. When the value 26 is detected for that field, it is established that the CPS packet is the last one for the current AAL2 SDU. It is thus also admitted into the buffer. However, the next packet, which will have the value 27 (or 26 if it contains the entire AAL SDU) at the level of its UUI field shall be discarded. The same applies to the packets of the same AAL2 SDU that follow, the latter being identified by the value 27 at the level of their UUI field, except for the last one which will have the value 26 for that field.

Preferably, the packet destruction step is effected before the buffer becomes completely saturated so that it is still possible to continue to accept CPS packets of a current frame and only to discard CPS packets of the next frame, knowing that a data frame has a limited maximum length, this length being e.g. 65 568 octets long in the case of an AAL2 SDU connection.

In order to manage the possible congestion and overflow conditions of the buffer efficiently, the method advantageously operates so that:
  for each incoming CPS packet, the Length Indicator field (LI) of the CPS Packet header is read to determine the length of the arriving CPS Packet;
  the thus determined length of the arriving CPS packet is used to update a buffer occupancy counter which is configured to store at least one amongst:
    i) the instantaneous number of octets used in the buffer for a given AAL2 connection;
    ii) the instantaneous number of octets used in the buffer for a given group of AAL2 connections;
    iii) the instantaneous number of octets used in the buffer by all AAL2 connections stored therein.

The present invention also relates to a device for managing data packets originating from data frames, the CPS packets being presented to buffer means prior to processing, comprising:
  packet analysing means for analysing if a CPS packet presented to said buffer means is a first CPS packet of a frame;
  means for determining whether the filling level of the buffer means exceeds a first predetermined filling threshold corresponding to a state of congestion and,
  means active when the filling level of said buffer means exceeds the first threshold to discard systematically before the buffer this first CPS packet of a frame and all following CPS packets belonging to that same frame.

The device can moreover be configured to implement all the process steps defined above and in the method claims.

It can be centred around a processor operating from a program in accordance with a classical computer architecture. In the case of an AAL2 connection, the processor can be assimilated to the general processing means which manage communications and the buffer which receives the CPS packets.

BRIEF DESCRIPTION OF THE DRAWINGS

Other advantages and characteristics of the invention shall appear more clearly from the description of the preferred embodiments, given purely by way of an example, with reference to the appended drawings in which.

MORE DETAILED DESCRIPTION OF THE INVENTION

The management method according to the is invention shall be described keeping the example of the messages shown in FIGS. 2 and 3.

However, the notion of congestion and overflow shall first be described with reference to FIG. 5.

Figure 5:
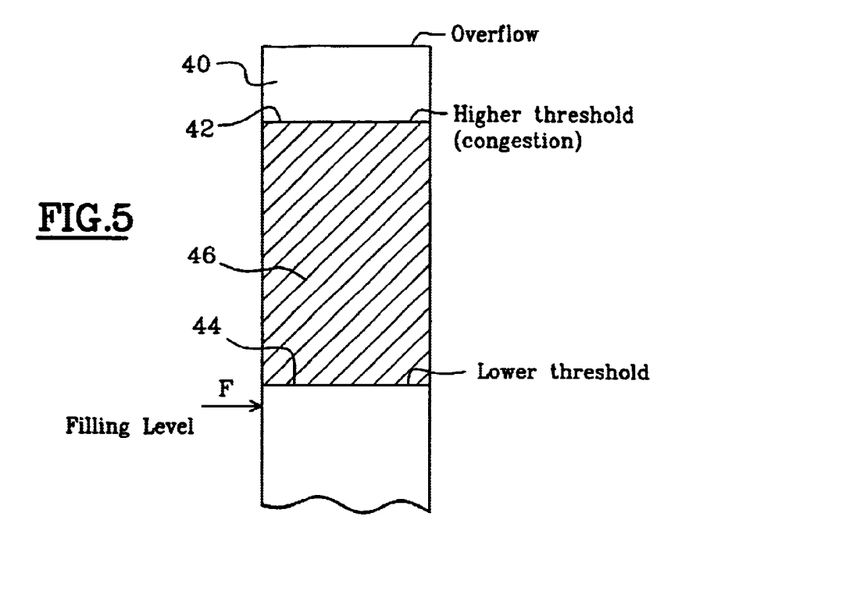
FIG. 5 shows schematically the filling level of a buffer memory, indicating the different filling thresholds in accordance with an embodiment of the invention.

FIG. 5 shows in column form the storage capacity of a buffer memory 40 which receives CPS packets before they are multiplexed into CPS PDUs for loading into ATM cell payloads. The memory's filling level at a given moment is indicated by arrow F. The higher is the arrow F, the more the memory 40 is filled.

The memory 40 comprises two filling thresholds: an higher threshold 42, close to the absolute limit of the memory, which corresponds to a congestion threshold, and a lower threshold 44 which corresponds to a lower filling level of the memory. Between these thresholds 42, 44 is defined a critical zone 46 which, as will be explained later, defines a hysteresis range.

A congestion situation is reached when the filling level of the buffer memory 40 reaches or exceeds the higher threshold 42. However, once this threshold is reached or exceeded, the congestion condition remains all the while the filling level of the memory remains in the critical zone 46. In other words, even if the filling level (arrow F) drops somewhat to fall beneath the higher threshold 42 but stays within the critical zone 46, the congestion condition remains. It is then necessary for the filling level to fall below the lower threshold 44 to end the congestion situation.

If the congestion condition thus ceases, it can exist again only if the higher limit 42 comes to be exceeded. It is for this reason that the critical zone 46 forms a hysteresis range in accordance with an embodiment of the invention.

The overflow situation is simply the case where the memory's absolute storage limit is reached. In other words, the buffer memory is physically no longer capable of receiving new packets in an overflow situation.

In case of congestion, it will be in some cases necessary to discard CPS packets before they reach the buffer 40. According to the present invention, the packets discarded will be those originating from a same AAL2 SDU frame. In other words, when a congestion condition is reached according to the above-mentioned criteria, it can still be possible to continue storing CPS packets from an AAL2 SDU frame in the course of reassembly (by virtue of the margin between the higher threshold 42 and the buffer memory's overflow level), but as soon as that frame is loaded, the packets coming from the following AAL2 SDU shall be systematically discarded.

An example of a selective packet discard algorithm shall now be described with reference to FIGS. 6–10.

The algorithm is divided into three phases. The first phase determines when a congestion condition occurs, the second phase selectively discards CPS packets, and the third phase determines whether the next CPS packet is the first of an AAL2 SDU frame.

Phase One: Congestion Decision Algorithm

Figure 6:
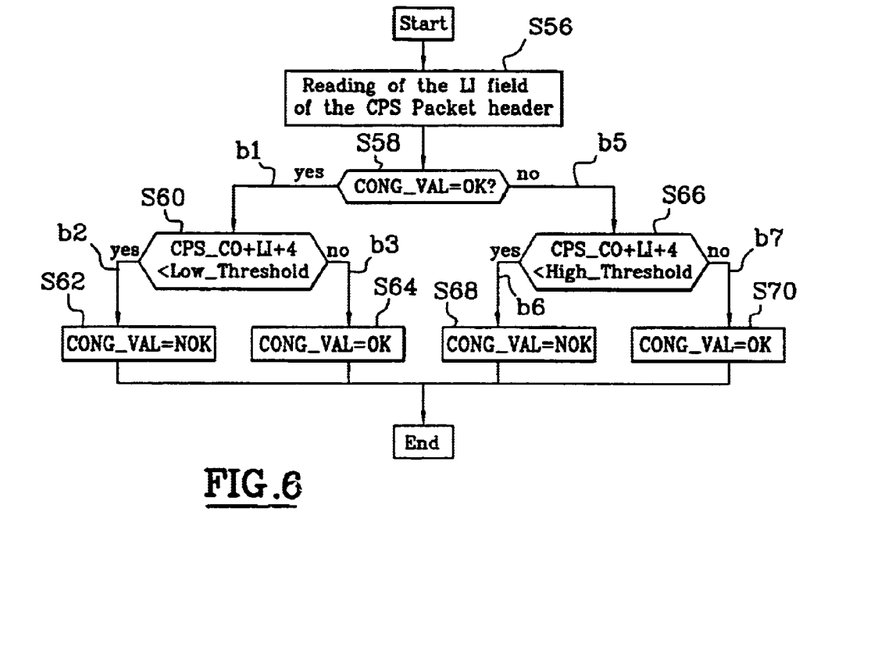
FIG. 6 is a flow chart for a decision algorithm for congestion management in accordance with the invention.

This algorithm decides whether or not the buffer 40 is congested.

The congestion criterion is as described with reference to FIG. 5 i.e. with the hysteresis condition.

The algorithm is shown in the flow chart of FIG. 6.

In order to function, the algorithm requires the following parameters:

i) internal parameters (per AAL2 connection, group of AAL2 connections or per buffer):

CONG_VAL: congestion indicator. Its value is OK in case of congestion and NOK in case of no congestion.

CPS_CO (CPS counter). This is the counter which indicates the buffer's current filling level (for an AAL2 connection, a group of AAL2 connections or the entire buffer 40). In other words it indicates the number of octets present in the buffer for a given AAL2 connection (or for a given group of connections, or the total number of octets used).

ii) CPS packet context: a global context allows the LI values of the processed packets to be read (LI field read from the CPS packet header)

iii) Contexts configurable by connection, group of connections or by buffer:

CPS_Low_Threshold=lower threshold 44.

CPS_High_Threshold=higher threshold 42

The algorithm starts by reading the LI field from the header of each incoming CPS packet (step S56). The size of the CPS packet (in octets) is LI+1+3, 3 being the size of the header and LI+1 being the size of the CPS packet payload.

It is then determined whether the buffer 40 is in a state of congestion (step S58). If the buffer is in a state of congestion (CONG_VAL=OK)—as determined at a previous sampling—the algorithm passes along branch b1, and the value CPS_CO+LI+1+3 is compared with the lower threshold (step S60). If CPS_CO+LI+1+3 is lower than that threshold 44, then it is determined that the initially declared congestion condition is no longer true and the algorithm passes along branch b2 to set the value CONG_VAL=NOK (step S62). If CPS_CO+LI+1+3 is greater than or equal to CPS_Low_Threshold, it is determined that a congestion condition still exists and the algorithm passes along branch b3 to maintain CONG_VAL=OK (step S64).

If the buffer 40 is initially not in a state of congestion (CONG_VAL=NOK; step S58), the algorithm passes along branch b5 to compare CPS_CO+LI+1+3 with the higher threshold 42 (step S66). If CPS_CO+LI+1+3 is less than CPS_High_Threshold, there is no congestion and CON VAL=NOK (branch b6, step S68). If CPS_CO+LI+1+3 is greater than or equal to CPS_High_Threshold, then it is determined that there is a state of congestion and CONG_VAL=OK (branch b7, step S70).

Phase 2: CPS Packet Discard Algorithm

Figure 7:
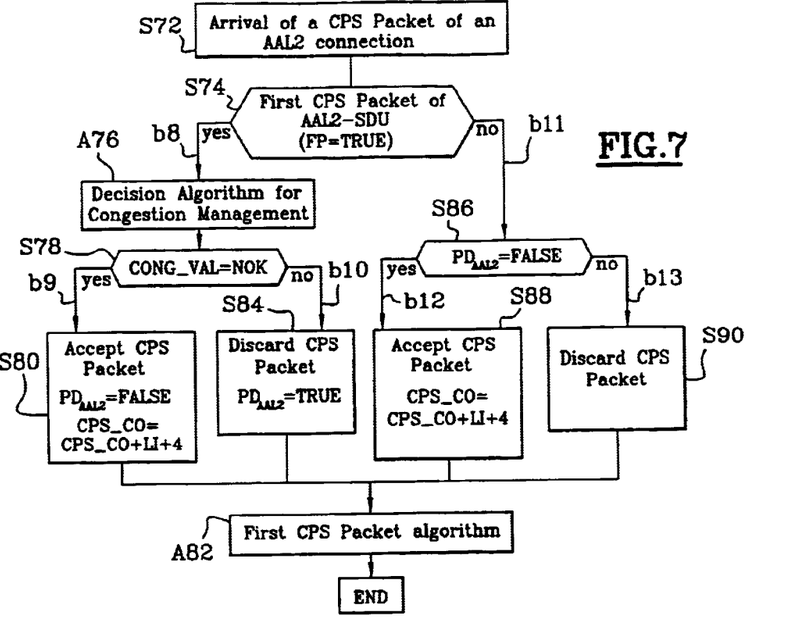
FIG. 7 is flow chart for the complete intelligent packet discard algorithm in accordance with a first embodiment of the invention.

In addition to the above-defined contexts, the mechanism requires:

for each AAL2 connection, a context bit $PD_{AAL2}$ (packet discard) which indicates whether or not the CPS packet discard mechanism is activated by that connection (respectively "True" and "False"); and for each AAL2 connection, a context bit FP (First Packet) which indicates whether or not a processed CPS packet (being processed or following) is the first one (or not) of an AAL2 SDU.

The algorithm is shown in FIG. 7.

The procedure starts at step S72 with the arrival of a CPS packet from an AAL2 connection. There then follows an algorithm which determines whether this packet is to be stored in the buffer 40 or discarded.

It is first determined whether the packet is the first one of an AAL2 SDU by considering the FP context (step S74) This can be detected by noting that the UUI field of the previous CPS packet was at value 26. It will be assumed that such is the case, for example by considering the first packet of the 150 octet frame shown in FIG. 2. The algorithm then passes along branch b8 where it is determined whether the buffer 40 is in a state of congestion by applying the congestion decision algorithm described for phase 1 above(step A76). At the conclusion of this algorithm, it is determined whether there is no congestion (CON_VAL=NOK, step S78). If there is no congestion (branch b9), the CPS packet is accepted into the buffer and consequently the packet discard mechanism is inhibited ($PD_{AAL2}$=FALSE). At the same time, the counter CPS_CO is updated to include the octets of the received packet (CPS_CO=CPS_CO+LI+4) (step S80).

Next is performed a first CPS packet determination algorithm described below (step A82).

There shall now be discussed the case where the first above-mentioned packet arrives when the buffer memory 40 is in a state of congestion according to the criteria explained with reference to FIGS. 5 and 6. The algorithm passes from step S78 along branch b10 to initiate the incoming packet discard mechanism, starting from the CPS packet being processed. To this end, the packet discard indicator is set to $PD_{AAL2}$=TRUE (step S84). Next, the first CPS packet algorithm is executed (algorithm A82) as in the previous case.

There shall now be considered the case where the received packet is not the first packet of an AAL2 SDU frame. In this case, the mechanism passes from step S74 along branch b11 where it is determined whether the CPS packet discard mechanism is not active ($PD_{AAL2}$=FALSE ?) (step S86). If the mechanism is not active, the algorithm passes along branch b12 to accept the incoming CPS packet and to update the CPS_CO counter (step S88) and proceeds with the first CPS algorithm A82. The CPS_SO counter is then incremented by LI+3+1 (CPS_CO=CPS_CO+LI+1+3). Note that the acceptance of a next CPS packet in the buffer memory 40 proceeds without determining whether there is a state of congestion. All the following packets of a same AAL2 SDU shall thus be systematically accepted. In view of this, the higher threshold 42 of the buffer memory 40 can be set to leave a sufficient margin before overflow to accept an AAL2 SDU frame of maximum length, i.e. 65 568 octets or more.

There shall now be considered the case of following packets when it is determined for the first packet that there was a congestion and that this packet was therefore to be discarded. For each following packet, the algorithm will come to step S86 where it will be determined that the packet discard mechanism is activated ($PD_{AAL2}$=TRUE, branch b13). This means that the first packet of the current AAL2 SDU frame arrived at a moment when the memory was congested and was thus discarded at step S84 as explained above. Accordingly, each CPS packet of that AAL2 SDU frame shall be eliminated (step S90) and the algorithm then proceeds with the first CPS packet algorithm A82 mentioned above. Note that in this case all the CPS SDU packets of a same AAL2 SDU frame are systematically discarded after the packet is discarded, without taking the filling level of the memory into account.

For each CPS packet leaving the buffer memory 40, counter CPS_CO is decremented by the number of served CPS octets, i.e. CPS_CO=CPS_CO−number of served octets. The number of served octets is less than or equal to the size of the CPS packet (LI+3+1).

Phase 3: First CPS Packet Determination Algorithm

Figure 8:
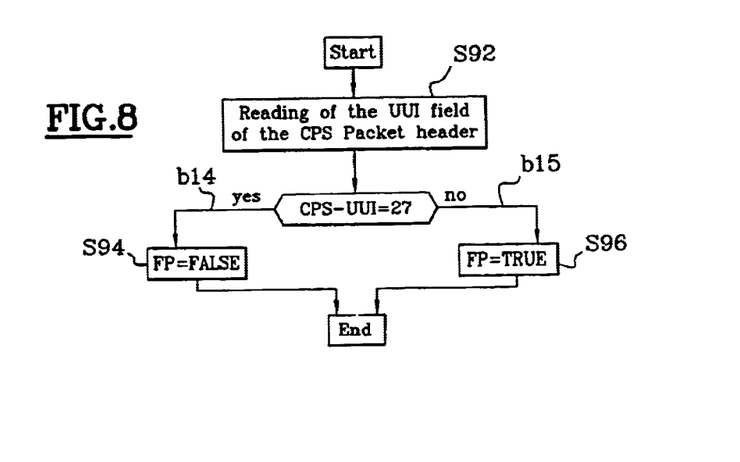
FIG. 8 is a flow chart for a first CPS packet detection algorithm used in the algorithm of FIG. 7.

This algorithm shown in FIG. 8 decides whether or not the next CPS packet of a given AAL2 to be processed is the first CPS packet of an AAL2 SDU frame.

In addition to the above-mentioned contexts, the first CPS packet determination algorithm requires a global context for reading the CPS UUI values of the processed CPS packets (CPS-UUI field read in the CPS packet header).

The algorithm starts by reading the UUI field of a CPS packet being processed (step S92). As explained above, this UUI field has the value 27 if at least one other CPS packet follows to complete the AAL2 SDU frame, and the value 26 if, on the contrary, the CPS packet is the last one of the frame. Note that a packet can be both the first and last packet of a frame, as in the case of packet 5 in FIG. 2.

Accordingly, if it is determined at step S92 that the UUI field is equal to 27, it is noted that the following packet cannot be the first packet of an AAL2 frame and the algorithm follows branch b14 to record the fact the next CPS packet shall not be first packet, i.e. FP=FALSE (step 94). In the opposite case, the algorithm follows branch b15 to record that the next CPS packet shall be the first packet of a new AAL2 SDU frame i.e. FP=TRUE (step 96). The algorithm terminates after step 94 or 96 for the packet in question.

There shall now be described with reference to FIG. 9 a second embodiment of the invention which constitutes a variant of the embodiment already described with reference to FIG. 7.

Figure 9:
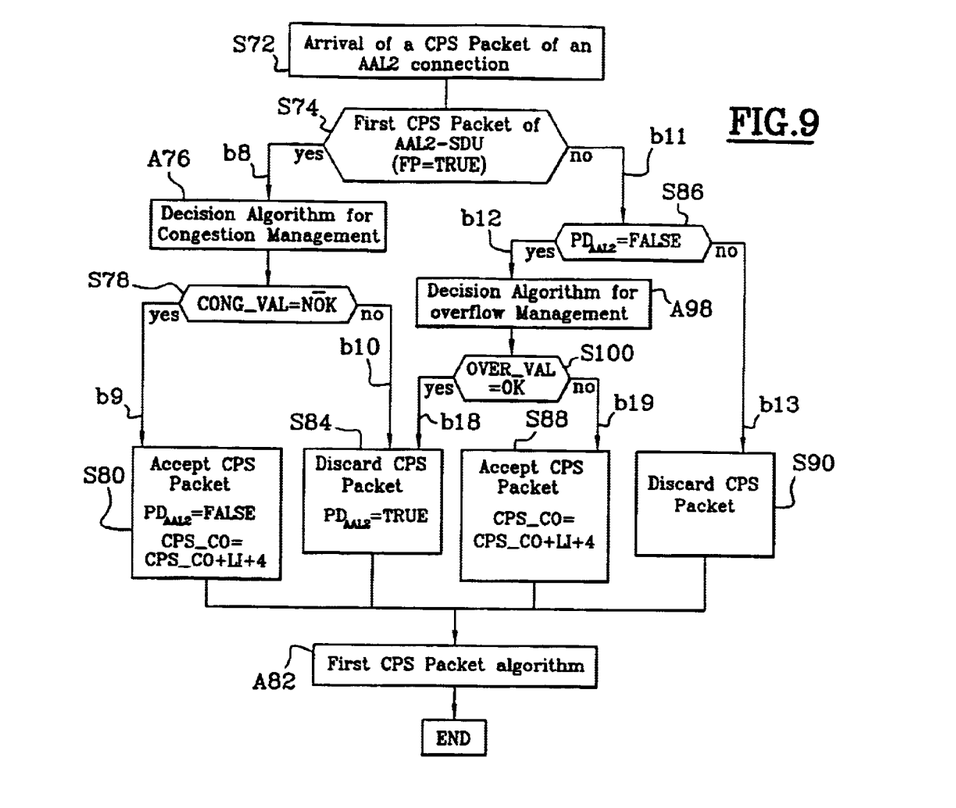
FIG. 9 is a flow chart for a complete intelligent packet discard algorithm in accordance with a second embodiment of the invention.

As shown in FIG. 9, this variant consists essentially in adding a decision algorithm A98 for overflow management and a decision step (S100) at branch b12 between steps S86 and S84/S88. All the other steps and branches are otherwise identical to the ones described in respect of FIG. 7 and shall not be repeated here for conciseness.

The algorithm serves to determine whether or not the buffer 40 is in an overflow state.

In addition to the previously described parameters, the decision algorithm for overflow management A98 requires the following two parameters:

OVER_VAL, which is an overflow indicator. Its value is OK if the buffer is in an overflow state and NOK if the buffer is not in an overflow state. (It is recalled here that a buffer overflow occurs when the buffer can physically no longer store data.); and BUF_CAP, which is the buffer capacity in octets. This parameter is configurable for each or a given buffer.

Figure 10:
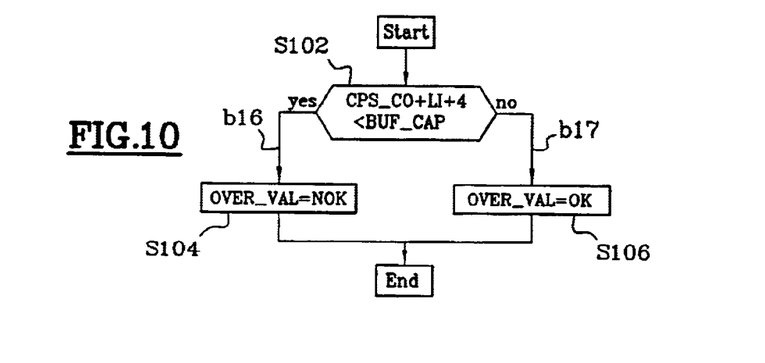
FIG. 10 is a flow chart for a decision algorithm for overflow management used in the algorithm of FIG. 9.

FIG. 10 shows the flow chart for the decision algorithm A98. It begins by determining whether the current octet counter value CPS_CO plus the size of the CPS packet being processed is less than the buffer capacity, i.e. CPS_CO+LI+1+3<BUF_CAP (step S102). If such is the case, then the buffer is not in a state of overflow. The algorithm then follows branch b16 to set the parameter OVER_VAL to the value NOK (step 104). Conversely, if it is determined at step 102 that the buffer 40 is saturated, the algorithm follows branch b17 to set the parameter OVER_VAL to OK (step 106).

After the decision algorithm for overflow management A98, the procedure in accordance with the second embodiment continues with step 100 mentioned above to determine value of OVER_VAL (FIG. 9).

If OVER_VAL=OK, i.e. the buffer 40 is saturated, the algorithm follows branch b18 which leads to the step S84 of discarding the current CPS packet and setting the parameter $PD_{AAL2}$=TRUE. Consequently, the algorithm for all the following CPS packets up to but excluding the next first packet will then evolve from step 74 described above to step 86 and thereafter follow branch b13, whereupon these packets shall be systematically discarded at step S90. Thus in the event of a buffer overflow as determined by the decision algorithm for overflow management the current CPS packet and all the following CPS packets of an AAL2 SDU are systematically discarded even if one or several initial packet(s) had been recorded in the buffer memory 40.

In other words, the second embodiment allows CPS packets of a given AAL2 SDU frame to be eliminated while one or several CPS packets have already been accepted into the buffer memory. This approach enables the higher threshold 42 (FIG. 4) to be set to a higher filling level of the buffer memory, and even at the limit of the buffer's maximum physical capacity.

On the other hand, if it is determined at step S100 that the buffer 40 is not saturated, the algorithm follows branch b19 to the above described step S88 of accepting the CPS packet and incrementing counter CPS_CO by LI+4.

The examples described all fall in the context of AAL2 connections. However, it is clear that that the teachings of the present invention can be applied to all packet transmission systems where analogous problems occur.

Finally, it will be clear to the skilled person that the algorithms described can be implemented in a number of different equivalent forms using appropriate hardware and software combinations.

What is claimed is:

1. A method of managing common part sublayer (CPS) packets originating from asynchronous transfer mode (ATM) adaptation layer type 2 service data unit (AAL2 SDU) frames originating from AAL2 connections, said CPS packets being presented to buffer means for storage before said CPS packets are multiplexed into asynchronous transfer mode (ATM) cells, the method comprising:

when a first CPS packet corresponding to the start of an AAL2 SDU frame is presented to the buffer stage, determining whether a filling level of the buffer means exceeds a first predetermined filling threshold corresponding to a state of congestion; and, if the filling level of the buffer means exceeds the first predetermined filling threshold, the first CPS packet and all CPS packets belonging to a same AAL2 SDU frame as the first CPS packet are systematically discarded before the buffer means.

2. The method according to claim 1, wherein, if said first filling threshold of the buffer means is exceeded, CPS packets are allowed to enter into said buffer means only if said CPS packets follow said first CPS packet and said first CPS packet was admitted into the buffer means prior to said first filling threshold being exceeded and said CPS packets originate from the same AAL2 SDU frame as said first CPS packet.

3. The method according to claim 1, wherein said state of congestion of said buffer means is attained upon exceeding said first filling threshold and wherein said state of congestion is left by passing below a second filling threshold of said buffer means, said second threshold being lower than said first threshold.

4. The method according to claim 1, wherein said first filling threshold is set such that a remaining capacity of the buffer means upon exceeding said first filling threshold is substantially sufficient to accept all remaining packets of the same AAL2 SDU frame as said first CPS packet which has been accepted into said buffer means.

5. The method according to claim 1, wherein:

for each CPS packet, the user-to-user interface (UUI) field is used to determine if said packet is the last CPS packet forming an AAL2 SDU frame and, if the packet is the last CPS packet, the following CPS packet is considered as a first CPS packet of a frame;

in the case of the first CPS packet of an AAL2 SDU frame, it is detected if the buffer means are in the state of congestion;

when the buffer means are in the state of congestion, said first packet and all the following CPS packets are discarded up to and including the packet for which it is detected that the UUI field of that packet corresponds to the last packet of the current AAL2 SDU frame.

6. The method according to claim 1, wherein:

for each CPS packet, the user-to-user interface (UUI) field is used to determine if said packet is the last CPS packet forming an AAL2 SDU frame and, if the packet is the last CPS packet, the following CPS packet is considered as a first packet of an AAL2 SDU frame;

in the case of a first CPS packet of an AAL2 SDU frame, it is detected if the buffer means are in the state of congestion;

if the buffer means are not in the state of congestion for said first CPS packet, said first CPS packet and all the CPS packets that follow are accepted systematically into said buffer means up to and including the packet for which it is detected that the UUI field of that CPS packet corresponds to the last packet of the current AAL2 SDU frame.

7. The method according to claim 1, wherein:

for each CPS packet, the user-to-user interface (UUI) field is used to determine if said packet is the last CPS packet forming an AAL2 SDU frame and, if the packet is the last CPS packet, the following CPS packet is considered as a first packet of a frame;

in the case of a first CPS packet of an AAL2 SDU frame, it is detected if the buffer means are in the state of congestion;

if the buffer means are not in the state of congestion said first CPS packet is accepted into said buffer means and, for each following CPS packet belonging the same AAL2 SDU frame as said first packet, said packet is accepted only if said buffer means are not in a state of overflow.

8. The method according to claim 1, wherein:

for each incoming CPS packet, the Length Indicator field (LI) of the CPS Packet header is read to determine the length of the arriving CPS Packet;

the thus determined length of the arriving CPS packet is used to update a buffer occupancy counter which is configured to store at least one amongst:
  i) the instantaneous number of octets used in the buffer for a given AAL2 connection;
  ii) the instantaneous number of octets used in the buffer for a given group of AAL2 connections;
  iii) the instantaneous number of octets used in the buffer by all AAL2 connections stored therein.

9. A device for managing common part sublayer (CPS) packets originating from asynchronous transfer mode (ATM) adaptation layer type 2 service data unit (AAL2 SDU) frames originating from AAL2 connections, and said CPS packets are presented to buffer means for storage before said CPS packets are multiplexed into asynchronous transfer mode (ATM) cells, said device comprising:

packet analysing means for determining whether a first CPS packet presented to said buffer means corresponds to the start of an AAL2 SDU frame;

congestion determining means for determining whether the filling level of the buffer means exceeds a first predetermined filling threshold corresponding to a state of congestion; and, packet discarding means for systematically discarding before said buffer means said first CPS packet of an AAL2 SDU frame and all following CPS packets belonging to the same AAL2 SDU frame as said first CPS packet when said first predetermined filling threshold of said buffer means is exceeded.

10. The device according to claim 9, wherein said packet discarding means allows said CPS packets to enter into said buffer means when said first predetermined filling threshold of said buffer means is exceeded only if said CPS packets follow said first CPS packet admitted into the buffer means prior to said first filling threshold being exceeded and originate from the same AAL2 SDU frame as said first CPS packet.

11. The device according to claim 9, wherein said state of congestion of said buffer means is attained upon exceeding said first threshold and said state of congestion is left by passing below a second filling threshold of said buffer means, said second filling threshold being lower than said first filling threshold.

12. The device according to claim 9, wherein said first filling threshold is set such that a remaining capacity of the buffer means upon exceeding said first filling threshold is substantially sufficient to accept all remaining packets of an AAL2 SDU frame whose first CPS packet has been accepted into said buffer means.

13. The device according to claim 9, wherein said packet analysing means determines for each CPS packet from the user-to-user interface (UUI) field thereof whether said packet is the last CPS packet forming an AAL2 SDU and, if said packet is the last CPS packet, the following CPS packet is considered as a first CPS packet;

said congestion determining means, in the case of a first CPS packet of an AAL2 SDU frame, detects if the buffer means are in the state of congestion; and said packet discarding means, when said buffer means is in the state of congestion, discards said first CPS packet and all the following CPS packets up to and including the packet for which it is detected that the UUI field of that packet corresponds to the last packet of the current AAL2 frame.

14. The device according to claim 9, wherein said packet analysing means determines for each CPS packet from the user-to-user interface (UUI) field thereof whether said packet is the last CPS packet forming an AAL2 SDU and, if said packet is the last CPS packet, the following CPS packet is considered as a first CPS packet;

said congestion determining means in the case of a first CPS packet of an AAL2 SDU frame detects if the buffer means are in the state of congestion; and said packet discarding means, when the buffer means are not in the state of congestion for said first CPS packet, systematically accepts said first CPS packet and all the CPS packets that follow into said buffer means up to and including the packet for which it is detected that the UUI of that CPS packet corresponds to the last CPS packet of the current AAL2 SDU frame.

15. The device according to claim 9, wherein said packet analysing active for each CPS packet determines from the user-to-user interface (UUI) field thereof whether said packet is the last CPS packet forming an AAL2 SDU and, if said packet is the last CPS packet, the following CPS packet is considered as a first packet;

said congestion determining means, in the case of a first CPS packet of an AAL2 SDU frame, detects if the buffer means are in the state of congestion; and said packet discarding means, when said buffer means are not in a state of congestion, accepts into said buffer said first CPS packet and, for each following CPS packet belonging to a same AAL2 SDU frame, accepts said packet only if said buffer is not in a state of saturation.

16. The device according to claim 9, further comprising:

means for reading the Length Indicator field (LI) of each incoming CPS packet to determine the length of the arriving CPS Packet;

means for updating on the basis of the thus determined length of the arriving CPS packet a buffer occupancy counter which is configured to store at least one amongst:
  i) the instantaneous number of octets used in the buffer for a given AAL2 connection;
  ii) the instantaneous number of octets used in the buffer for a given group of AAL2 connections;
  iii) the instantaneous number of octets used in the buffer by all AAL2 connections stored therein.

* * * * *